Dec. 7, 1937.         H. W. MOORE         2,101,718
INDICATOR GAUGE
Original Filed July 13, 1933

INVENTOR.
Harry W. Moore
BY Henry G. Dybvig
His ATTORNEY.

Patented Dec. 7, 1937

2,101,718

UNITED STATES PATENT OFFICE 2,101,718

INDICATOR GAUGE

Harry W. Moore, Greene County, Ohio

Original application July 13, 1933, Serial No. 680,225. Divided and this application June 13, 1936, Serial No. 85,105

4 Claims. (Cl. 33—172)

This invention relates to a dynamic balancing apparatus and more particularly to the means for rapidly ascertaining and visually indicating the amplitude of unbalanced area of a rotating body.

This is a divisional application of my copending application Serial No. 680,225 filed July 13, 1933 for Dynamic balancing apparatus. Only so much of the apparatus as is deemed necessary to properly understand the operation of the means for visually indicating the amplitude of unbalance of a rotating body and the cooperation thereof with the apparatus for ascertaining the angle of unbalance will be described in this application.

A condition of unbalance in a rotating mass induces vibratory forces and reactions in the mounting of the unbalanced body which are highly objectionable and injurious to the equipment in which the body may be employed. Such vibratory reaction, however, is utilized in the present instance to operate indicating means by which the unbalanced condition is accurately and quickly defined, both as to magnitude and location.

The purpose of the present dynamic balancing apparatus is to measure and locate the magnitude of unbalance in terms of two planes which can be selected for correction and to compensate such condition of unbalance by adding or removing material in or near these planes. To do either, two indicating means are employed one of which measures the range or magnitude of the induced vibratory movement of the rotating mass indicating the amplitude of the unbalanced condition; the other, which is of multiple character, operates to indicate the angular position of the point of unbalance in relation to different planes of rotation.

The object of the invention is to simplify the construction as well as the means and mode of operation of dynamic balancing apparatus for rotating bodies whereby such apparatus will not only be cheaper in construction but will be more efficient in use, automatic in its action, accurate in results, rapid in operation, easily controlled and unlikely to get out of repair.

A further object of the invention is to provide an automatic means for measuring and accurately indicating the magnitude or amplitude of the unbalanced condition existing in the rotating body.

A further object of the invention is to provide an apparatus into which the body to be tested can be quickly and readily installed and removed and wherein the test may be made rapidly by a comparatively unskilled operator.

A further object of the invention is to provide a simple but sturdy apparatus suitable for mass production use which will enable quantity testing to be conducted with rapidity and accuracy.

Another object of this invention is to provide pairs of indicators located at opposite ends of the body to be tested whereby the operator may make observations without leaving his position for making observations.

Other objects and advantages reside in the construction of parts, the combination thereof and the mode of operation, as will become more apparent from the following description.

In the accompanying drawing, wherein the preferred, but obviously not necessarily the only form of embodiment of the invention is shown, Fig. 1 is a side elevation of the present invention.

Figure 1:
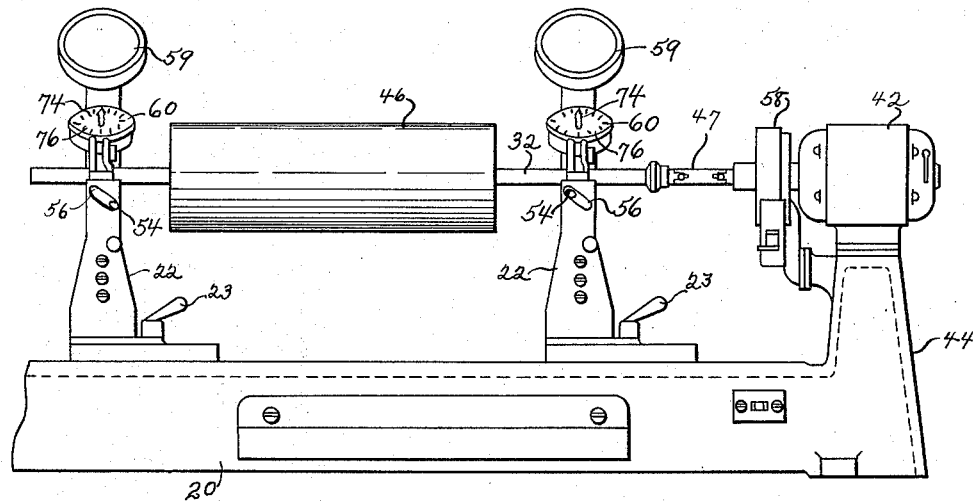

Referring to the drawing, 20 is the base, or bed, of the apparatus upon which are adjustably mounted two or more upright rigid frames 22 engaging in ways or grooves in the bed 20 for sliding movement toward and from each other while maintaining their parallel relation. The adjustable frames 22 are locked in adjusted position by clamps 23. Carried by each frame 22 is a flexible standard 24 fixedly mounted upon the bottom of a frame at its lower end and free at its top for to and fro vibratory motion. Carried at the upper end of each of the vibratory standards 24 is a mounting head 25 including aligning antifriction rollers 26. Rollers 26 are preferably rotatably mounted. The rollers 26 are thus mounted upon each head providing a support for the shaft 32 of the rotating body.

Figure 2:
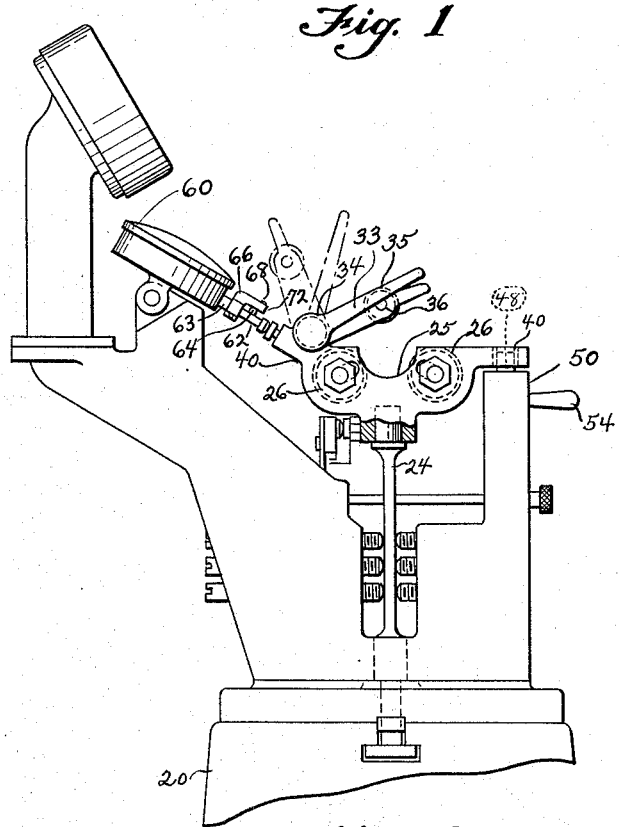
Fig. 2 is an end elevation of the assembled apparatus embodying the present invention.
Figure 3:
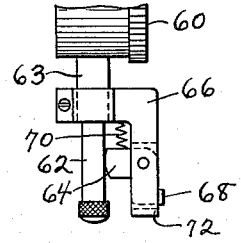
Fig. 3 is a fragmentary enlarged view of the amplitude indicating gauge.
Figure 4:
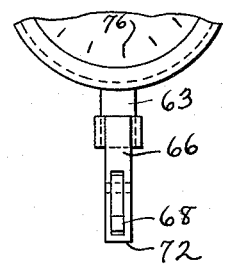
Fig. 4 is an enlarged fragmentary plan view as seen from the right of Fig. 3.

After the rotating body has been placed upon the rollers 26, an arm 33 pivotally mounted at 34 that carries a roller 35 rotatably mounted upon a pintle 36 fixedly attached to the arm 33, is rotated from the dot and dash position shown in Fig. 2 to the full line position therein.

The head 25 is formed with oppositely extending arms 40 which cooperate with meters or gauges to measure and indicate the magnitude and time of the vibratory action of an unbalanced rotating body carried upon the rollers 26, as will appear more fully later. The body to be tested is mounted for free rotary motion upon the rollers 26 of the respective heads 25 and is driven at a comparatively high rate of speed by an electric motor 42 mounted upon a pedestal 44 arising from the base or bed 20 of the apparatus. The driving motor 42 is connected with a rotary body under test by a flexible drive shaft 47 which permits unrestricted to and fro motion of the driving body upon the vibratory supporting standards 24 while maintaining rotary driving connection therewith. In Fig. 1 there is indicated a motor or armature 46 mounted in the apparatus for test. The shaft 32 of the armature 46 is mounted in the self aligning anti-friction rollers 26 of the respective heads 25, each of which is independently supported by a flexible standard 24, the shaft 32 being operatively connected with the driving motor 42 by the shaft 47.

A detent plunger 48 is maintained in a position on hub 50 upon each frame 22 for locking engagement with the adjacent vibratory mounting head 25 under influence of a spring not shown. The detent plunger 48 is provided with a radial stud or handle 54 engaging in a spiral cam groove 56 which sets to retract and hold the detent plunger 48 in inoperative position upon partial rotation of the plunger by means of the handle 54. The detents are independently operable so that the mounting heads at either end of the rotary body being tested may be held immovable while the mounting head at the opposite end of the body is permitted to vibrate freely.

The angle of unbalance is measured by an electrical system including a commutator assembly or distributor 58, having parts driven in synchronism with the body to be tested and indicated on the dial 59. Reference is made to the parent application Serial No. 680,225 for a detailed description thereof.

The rotation of an unbalanced body carried by the rollers 26 of the mounting heads 25 induces a to and fro vibratory motion of the body upon the standards 24, the extent of which for a given speed is proportionate to the degree of unbalance.

To determine the maximum extent of vibratory motion resulting from rotation of the unbalanced body, there is mounted upon each frame 22 at one side of the vibratory mounting head 25 a gauge 60. This gauge is actuated through a reciprocatory operating stem 62 by thrust pressure of the head 25 in its vibratory motion.

To conveniently arrest the movement of the operating stem 62 a friction detent 64 pivoted in the mounting 66 is secured to the plunger guide 63 of the gauge 60, serving to hold the stem 62 in its restrictive position to which it has been moved by the impact of the vibratory head. This detent 64 has at one end a push button 68 which is pivoted slightly above its center line and hence has a slight eccentric cam action against the plunger 62 under influence of a spring 70. The plunger is instantly released by pressing the push button 68 which is limited in its movement by its support 72 integral with 66.

The operating stem or plunger 62 through suitable amplifying mechanism actuates a pointer 74 mounted for oscillatory movement in the gauge 60. The magnitude of unbalance is indicated by the movement of the pointer 74 registering with suitable graduations 76. The deflection from zero is proportionate to the movement of the stem 62.

As the stem 62, due to the friction detent 64, cannot return to zero position after each impulse imparted thereto by the vibratory head 25, the pointer 74 when actuated by the stem 62 is held in deflected position until the operator releases the friction detent 64 by pressing push button 68, thereby resetting the stem 62 and the pointer 74.

Although the preferred modification of the device has been described, it will be understood that within the purview of this invention various changes may be made in the form, details, proportion and arrangement of parts which generally stated, consist in a device capable of carrying out the objects set forth, in the novel parts, combination of parts and mode of operation, as disclosed and defined in the appended claims.

Having thus described my invention, I claim:

1. An attachment for a gauge having a smooth reciprocatory stem for actuating the gauge to measure movement of the stem in one direction, said attachment including a pair of substantially L-shaped members, the legs of one being longer than the legs of the other, said members being pivotally interconnected with the legs of one member extending substantially parallel to the legs of the other, one leg of one member fixedly supporting said attachment on the gauge, the corresponding leg of the other member engaging the stem of the gauge, and releasable means for causing the leg engaging the stem to prevent movement of the stem in one direction but permitting movement of the stem in the opposite direction.

2. An attachment for a gauge terminating in a tubular sleeve portion having a reciprocatory operating stem mounted in said sleeve portion, said stem having a smooth surface, said attachment including an L-shaped bracket supported upon said sleeve portion, and a detent pivoted in said bracket adjacent to the stem and having swinging movement into lateral compressive contact engagement with the smooth surface thereof, the movement of the stem in one direction tending to oscillate the detent to relax its engagement with the stem, the return oscillation of the detent causing operative engagement thereof with the stem to prevent return movement of the stem.

3. An attachment for a gauge terminating in a tubular sleeve portion having a reciprocatory operating stem mounted in said sleeve portion, said stem having a smooth surface, said attachment including a support mounted upon said sleeve portion, a gripper member pivoted in said support adjacent to the stem and having swinging movement into lateral contact engagement with the smooth surface of the stem, and a spring biasing said gripper member, the movement of the stem in one direction tending to oscillate the gripper member against the force of the spring to relax the gripper member's engagement with the stem, the return oscillation of the gripper member causing operative engagement thereof with the stem to prevent return movement thereof.

4. An attachment for a gauge having a housing terminating in a tubular opening having a reciprocatory operating stem mounted in said opening, said stem having a smooth surface, said attachment including a support mounted upon said housing, a gripper member pivoted in said support adjacent the stem and having swinging movement into lateral contact engagement with the smooth surface of the stem, and a spring biasing said gripper member, the movement of the stem in one direction tending to oscillate the gripper member against the force of the spring to relax the gripper member's engagement with the stem, the return oscillation of the gripper member causing operative engagement thereof with the stem to prevent return movement thereof, said gripper member having an extension manually engageable to release the stem to permit its return movement.

HARRY W. MOORE.